(12) United States Patent
Baba et al.

(10) Patent No.: US 7,952,755 B2
(45) Date of Patent: May 31, 2011

(54) INK-JET RECORDING DEVICE, IMAGE PROCESSING DEVICE AND IMAGE PROCESSING METHOD, FOR PERFORMING SHARPNESS PROCESSING OF IMAGE

(75) Inventors: Naoko Baba, Kawasaki (JP); Daigoro Kanematsu, Yokohama (JP); Mitsutoshi Nagamura, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 705 days.

(21) Appl. No.: 11/733,116

(22) Filed: Apr. 9, 2007

(65) Prior Publication Data

US 2007/0242096 A1 Oct. 18, 2007

(30) Foreign Application Priority Data

Apr. 17, 2006 (JP) ................................ 2006-113446
Mar. 12, 2007 (JP) ................................ 2007-061725

(51) Int. Cl.
*G06F 15/00* (2006.01)
*H04N 1/00* (2006.01)
*B41J 2/205* (2006.01)

(52) U.S. Cl. ............................. 358/1.9; 347/15; 358/1.6

(58) Field of Classification Search ........................ None
See application file for complete search history.

(56) References Cited

U.S. PATENT DOCUMENTS

| | | | |
|---|---|---|---|
| 6,709,082 B2 | 3/2004 | Kaneko | |
| 6,753,976 B1 * | 6/2004 | Torpey et al. .................. | 358/1.9 |
| 2002/0075493 A1 * | 6/2002 | Harrington .................... | 358/1.9 |
| 2002/0118380 A1 * | 8/2002 | Krueger et al. ................ | 358/1.9 |
| 2005/0057604 A1 * | 3/2005 | Ogasawara .................... | 347/41 |
| 2006/0103857 A1 * | 5/2006 | Janisch .......................... | 358/1.1 |
| 2007/0153046 A1 * | 7/2007 | Kanematsu et al. ............ | 347/19 |

FOREIGN PATENT DOCUMENTS

EP 1191784 3/2002

* cited by examiner

*Primary Examiner* — Twyler L Haskins
*Assistant Examiner* — Barbara D Reinier
(74) *Attorney, Agent, or Firm* — Canon U.S.A, Inc. IP Division

(57) ABSTRACT

Color processing is performed for each image data, so as to switch generating methods for black data to perform appropriate sharpness processing regarding image data wherein sharpness of printing results is important and image data wherein gradation of the image is important. A recording device is provided, wherein by performing such processing, black images such as characters or lines maintain sharpness or clarity, and picture images can be formed as high quality images.

11 Claims, 18 Drawing Sheets

CYAN IMPARTED   YELLOW IMPARTED
MAGENTA IMPARTED   BLACK IMPARTED

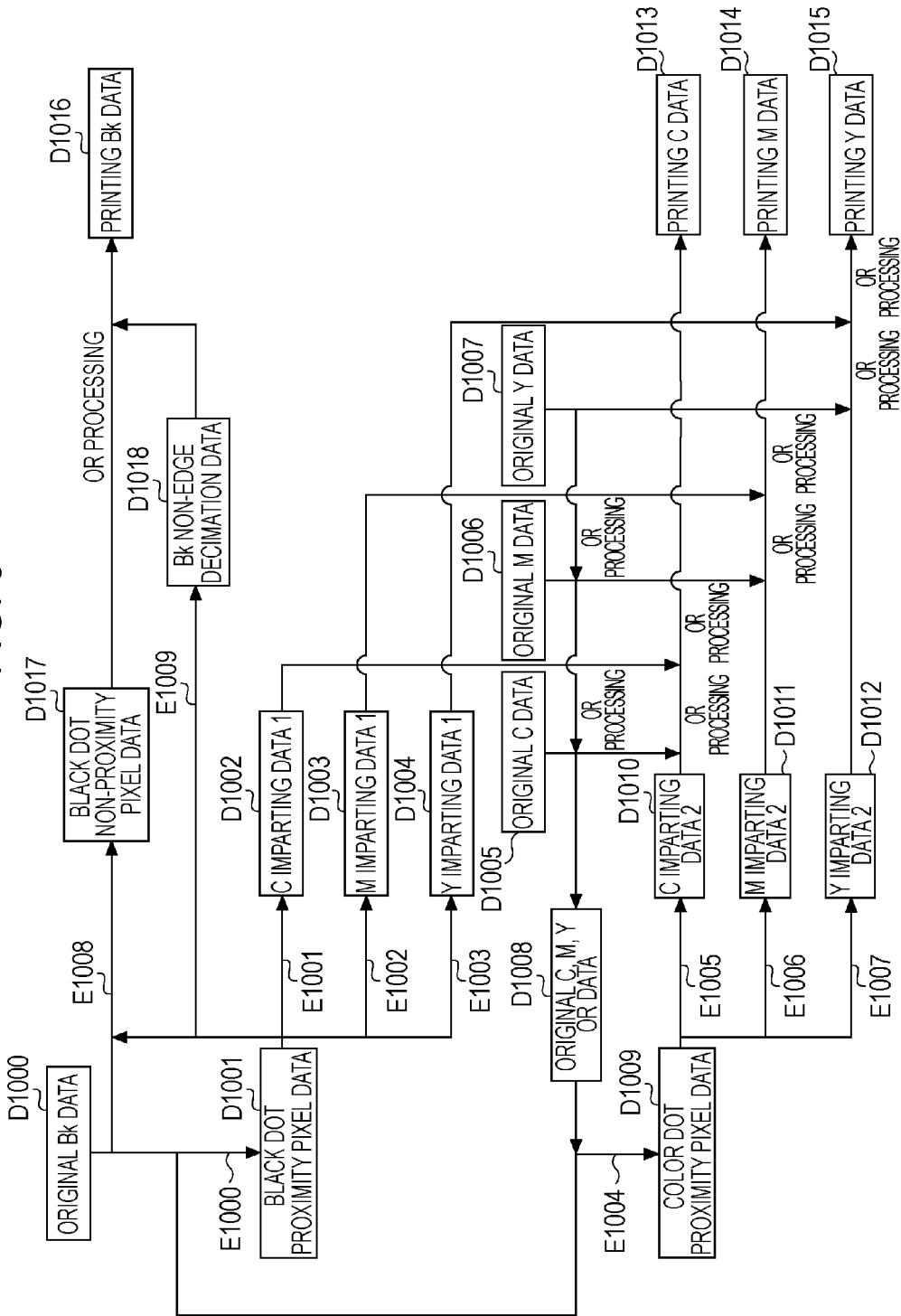

INK-JET RECORDING DEVICE, IMAGE PROCESSING DEVICE AND IMAGE PROCESSING METHOD, FOR PERFORMING SHARPNESS PROCESSING OF IMAGE

BACKGROUND OF THE INVENTION

1. Field of the Invention

The present invention relates to an ink-jet recording device, an image-processing device, and an image processing method, and in particular relates to a decimation process of adjacent dots of black ink and color ink in the event of performing recording using black ink and color ink.

2. Description of the Related Art

Printers serving as an information output device of a personal computer, word processor, facsimile apparatus, or the like for example, which perform recording of information such as desired characters or images to a sheet-type recording medium such as a paper sheet or film or the like, are widely used. Various methods are known as recording methods of a printer, but the ink-jet method has attracted attention recently for reasons such as capability of non-contact recording onto a recording medium such as a paper sheet or the like, ease of coloring, extremely quiet operations, and so forth.

For an ink-jet method configuration, a serial-recording-method is generally used, whereby recording is performed by alternately performing recording scanning, which moves a carriage, whereupon a recording head is mounted, back and forth in the main scanning direction, and a conveying operation for conveying the recording medium in the sub scanning direction which intersects with the main scanning direction. During movement of the carriage, an image is formed by discharging ink from a recording head according to desired recording information. Note that by discharging multiple colors of ink from the recording head, color images are formed.

An ink-jet recording device which can easily form color images can also be used for many monochrome recording such as documents. In the case of such monochrome recording, realizing sharpness of the recorded image (characters or lines), clearness, and a high recording density (dark black) is required. A technique is known whereby the permeability of the black ink as to the recording medium is lowered (permeability is lowered) and the color material of the black ink is suppressed from permeating into the recording medium, in order to realize sharpness, clearness, and a high recording density of the recording image.

On the other hand, when a color image is recorded with an ink-jet recording device, a phenomenon can occur wherein, as different colors of ink are imparted on the recording medium adjacent to one another, the inks can mix with one another at the border portions thereof (also called feathering or border bleeding). When bleeding occurs at the border portions of the different color inks, the recording quality of the color image is decreased. In order to decrease the occurrence of this bleeding and form high-quality images, permeability of the color inks as to a recording medium is increased (permeability is improved), and prevents the color inks from mixing on a surface which is a non-recording medium.

However, in the case of using a black ink with low permeability, and color ink with high permeability, the two problems described below may occur.

First, since the color ink with high permeability permeates the recording medium, fixing time (the time until the ink is dry) is fast, but the color material within the ink of the black ink with low permeability does not easily permeate the recording medium, and so the fixing time is long. Therefore, in the case of continuously recording onto a recording medium, i.e. in the case of forming images onto multiple sheets of a recording medium and continuously discharging these, before the black ink imparted on the previous page completely dries, the image forming of the following page can be ended and discharged. Consequently, the surface on the previous page whereupon an image is formed (recording face) and the back face of the surface on the following page whereupon an image is formed (back face of the recording medium) rub together and soil the back face of the following recording medium page. Further, the recording face of the previous page is also soiled, and image quality is lowered. Such soiling of the recording face and back face of the recording medium is called "smearing". This smearing increases markedly as the time required for recording becomes shorter due to increases in recording speed of the recording device.

Also, with a recording device which records onto a long recording medium (paper roll), the recording medium is cut with a cutter after image forming, and the recording medium having been subjected to cutting is discharged into a receiving basket which is provided on the floor or on the recording device. At this time, the recording medium having been subjected to recording is not dry, and therefore with a recording device performing recording onto a long recording medium, even in the case of forming an image onto one recording medium sheet, the floor or basket into which the recording medium is discharged, or further the recording face also can become soiled.

Secondly, at a border region wherein the black ink and color ink have each been imparted on the recording medium, feathering of the black ink and color ink (border bleeding) can occur. This border bleeding occurs because the low permeability black ink remains on the recording medium but when the high permeability color ink imparted in an adjacent region permeates the recording medium, the black ink also permeates together. By bleeding occurring at the border of the black ink and the color ink, the image quality is reduced significantly.

As solutions for the above two problems, first through third measures are taken.

The first solution is a method for using fixing means of ink which enables the fixing of ink with heat or wind. According to the technology disclosed in Japanese Patent Laid-Open No. 07-047762, by using a fixing means, the ink is fixed quickly to the recording medium, and so smearing and border bleeding can be suppressed.

However, with this first solution, an increased device size and increased cost cannot be avoided in order to provide the fixing means. Also, with a serial-recording-method recording device, the transporting operation of the recording medium (medium subjected to recording) is performed continuously, and so when performing fixing of the ink at the fixing means, unevenness can occur in the sending process.

The second solution is a method for controlling discharge standby of the recording medium, so that discharge of the following page is not performed until the ink of the previously discharged page is dry. By temporarily stopping the recording operation to the following page until the ink of the previously discharged page is sufficiently dry, or by temporarily stopping the discharge operation of the recording medium after having an image formed on the following page, the occurrence of smearing can be suppressed.

However, with this second solution, the recording operation or the discharge operation is stopped until the ink on the previous page is dry, and therefore results in decrease of throughput, and the time required for recording becomes longer.

The third solution is a method for imparting the high permeability color ink so as to be layered over the black ink in a low-permeability-black-ink-imparting region. By discharging color ink layered over the black ink in a black ink imparting region, when the color ink permeates the recording medium the black ink also permeates together and the fixing of the black ink is accelerated, thus decreasing the occurrence of smearing. Further, a technology is disclosed in Japanese Patent Laid-Open No. 2003-159827, wherein an ink setting of the type is used whereby black ink and color ink are mixed together to react and coagulate, thus suppressing border bleeding. By performing the third solution or the method described in Japanese Patent Laid-Open No. 2003-159827, smearing and border bleeding can be suppressed without increasing the size of the device or decreasing throughput.

However, with the third solution, the black ink permeates the recording medium together with the color ink which is discharged in the black ink imparting region, and the color ink can bleed to the outer side of the black ink recording region. Consequently, the sharpness of the black image is deteriorated, and recording quality of black characters deteriorates. That is to say, sharpness, clearness, and high recording density of the recorded image cannot be realized.

Therefore, with the Japanese Patent Laid-Open No. 2005-144795, a method is thought of for decreasing the occurrence of smearing and border bleeding, while suppressing the decrease of recording quality of the black characters or the like. This Japanese Patent Laid-Open No. 2005-144795 detects a non-edge portion of the black dots formed with the black ink and a recording region wherein black ink and color ink is adjacent, and imparts color dots on the black-dot non-edge portion and the black ink coloring region on the recording medium wherein color and black inks are adjacent to one another. Further, a reduction technology is described in Japanese Patent Laid-Open No. 2005-144795 to reduce the discharge amount of the black dots on the black-dot non-edge portion. Thus, sharpness of black images such as characters, lines, and figures with sharp angles can be maintained, while improving on smearing and fixing, as well as decreasing border bleeding.

An example wherein sharpness of black images such as characters is maintained, and smearing and fixing are improved with the technology described in Japanese Patent Laid-Open No. 2005-144795, is shown in FIGS. 4C and 4D. FIG. 4C shows character data recorded with black ink, and FIG. 4D is an example of recording, having changed the density reduction of black ink and imparting conditions of the color ink at the edge portion and the non-edge portion. Thus, outlines are clear, and characters (and lines) can be formed with sharp images.

However, with the technology described in the above-described Japanese Patent Laid-Open No. 2005-144795, the following problems could occur.

FIG. 4A is an image showing the region wherein black ink is discharged. Also, FIG. 4B is an image showing the region wherein the technology described in the above-described Japanese Patent Laid-Open No. 2005-144795 is used to discharge black ink and color ink. With the technology described in the above-described Japanese Patent Laid-Open No. 2005-144795, the periphery (several dots worth) of the region of the image where black ink is not discharged (the blank pixels in the diagram) is determined to be the edge portion of a region wherein black ink is discharged, and also is not adjacent to the region wherein color ink is imparted. Therefore, reducing process of the black ink or imparting of the color ink is not performed. The blank pixels in the diagram are not a region for discharging color ink, and therefore this edge portion is determined to not be adjacent to a region wherein color ink is imparted, and so the imparting of color ink is not performed. On the other hand, a region separated from a region not including black ink by a predetermined number or more of dots (the region in the upper left in FIG. 4A, and so forth) is determined to be a non-edge portion of a region including black ink. Therefore, in order to reduce smearing, the discharge data of black ink is reduced to lessen the amount of black ink imparted, and also color ink is imparted, and the results in FIG. 4B are obtained. Note that FIG. 4B is an example of results wherein, at a non-edge portion of FIG. 4A, the black ink is reduced by 50%, and color dots are imparted at the ratio of cyan 5.5%, magenta 2.9%, and yellow 2.6%.

As is clear from FIG. 4B, the density and hue of the color changes between the edge portions and non-edge portions of the black ink, and further it is apparent that the gradation of the image markedly declines. With the technology in Japanese Patent Laid-Open No. 2005-144795 shown in FIGS. 4A through 4D, the black images of characters or lines which are not adjacent to the region of color ink have a clean and sharp outline, but with a picture image, sharpness can be deteriorated and image quality can decrease.

SUMMARY OF THE INVENTION

The present invention has taken the above problems in to consideration, and provides a recording device wherein a high quality image can be formed for a picture image, while maintaining sharpness and clearness of black images such as characters or lines.

With the present invention, an ink-jet recording device for printing images based on image data using a recording head comprises a determining unit configured to determine object attributes of the image data; a storing unit configured to store a plurality of conversion tables for conversion from a RGB color expression to a YMCK color expression; and a color conversion unit configured to convert color using a predetermined conversion table of the plurality of conversion tables, according to the object attributes determined by the determining unit; wherein the color conversion unit is configured to differentiate between a conversion table for use in color conversion of a picture image, and a conversion table for use in color conversion of a character image.

Also, with the present invention, an image-processing device for generating recording data based on image data wherein a plurality of pixels including pixels with black data and color data are arrayed comprises: a determining unit configured to determine object attributes of the image data; a storing unit configured to store a plurality of conversion tables for conversion from a RGB color expression to a YMCK color expression; and a color conversion unit configured to convert color using a predetermined conversion table of the plurality of conversion tables, according to the object attributes determined by the determining unit; wherein the color conversion unit is configured to differentiate between a conversion table for use in color conversion of a picture image, and a conversion table for use in color conversion of a character image.

Further, an image processing method for generating recording data based on image data wherein a plurality of pixels including pixels with black data and color data are arrayed comprises: a determining process of determining object attributes of the image data; and a color conversion process of converting color using a predetermined conversion table of a plurality of conversion tables for conversion from a RGB color expression to a YMCK color expression, according to the object attributes determined with the determining process; wherein the color conversion process differentiates between a conversion table for color conversion of a picture image, and a conversion table for color conversion of a picture image.

According to the present invention, by causing the conversion tables used in the event of converting the image data from RGB to CMYK to differ according to the object attributes, the black images of characters or line drawings can maintain the sharpness and clearness thereof, while forming a high quality image of a picture image.

Further features of the present invention will become apparent from the following description of exemplary embodiments with reference to the attached drawings.

BRIEF DESCRIPTION OF THE DRAWINGS

FIG. 8 is a block diagram describing the flow of detection of black-dot proximity pixels, detection of color-dot proximity pixels, generation of data with color dots provided, generation of reduced black image data, and generation of printing data.

DESCRIPTION OF THE EMBODIMENTS

The embodiments of the present invention will be described in detail below with reference to the drawings.

First Embodiment

Figure 1:
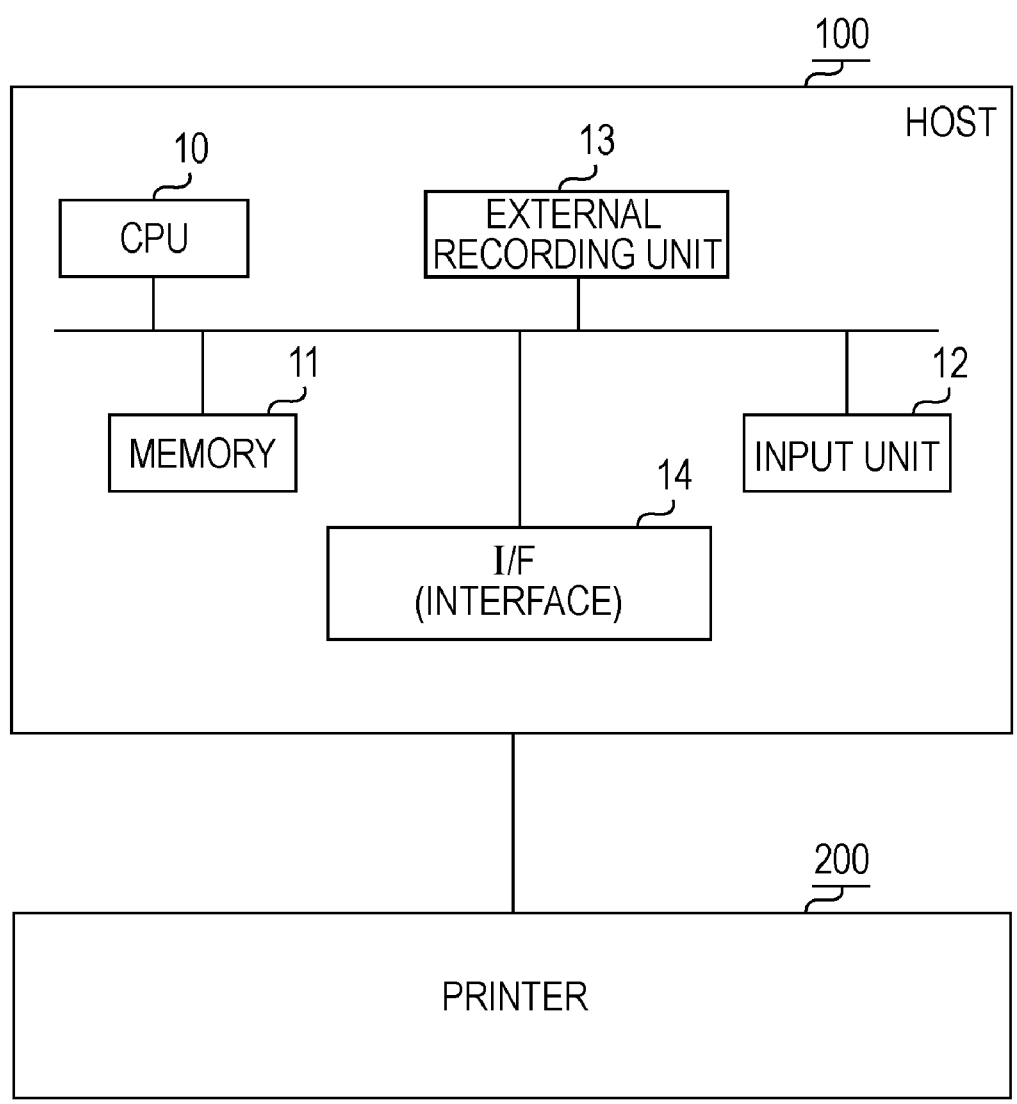
FIG. 1 is a block diagram illustrating an example of a configuration of a recording system according to an embodiment of the present invention.

FIG. 1 is a block diagram illustrating a configuration of a recording system according to an embodiment of the present invention. In the diagram, a host 100 serving as an information-processing apparatus is an apparatus such as a personal computer or digital camera, which is connected to a printer (recording device) 200. This host 100 has an interface 14 for communicating between a printer 200 and a CPU 10, memory 11, external storing unit 13, and input unit 12 such as a keyboard or mouse. The CPU 10 executes various processing according to the programs stored in the memory 11, and particularly executes color processing, image processing such as quantization processing or the like, and further executes recording properties correction processing relating to the present embodiment. These programs are stored in the external storing unit 13, or are supplied from an externally connected unit. The host 100 is connected with a printer 200 serving as a recording device via the interface, and can perform recording by transmitting the recording data that has been subjected to image processing to the printer 200. Also, a user may execute the program (application) stored in the memory 11 to create image data or recording data which are output from the printer.

Printer Configuration

Figure 2:
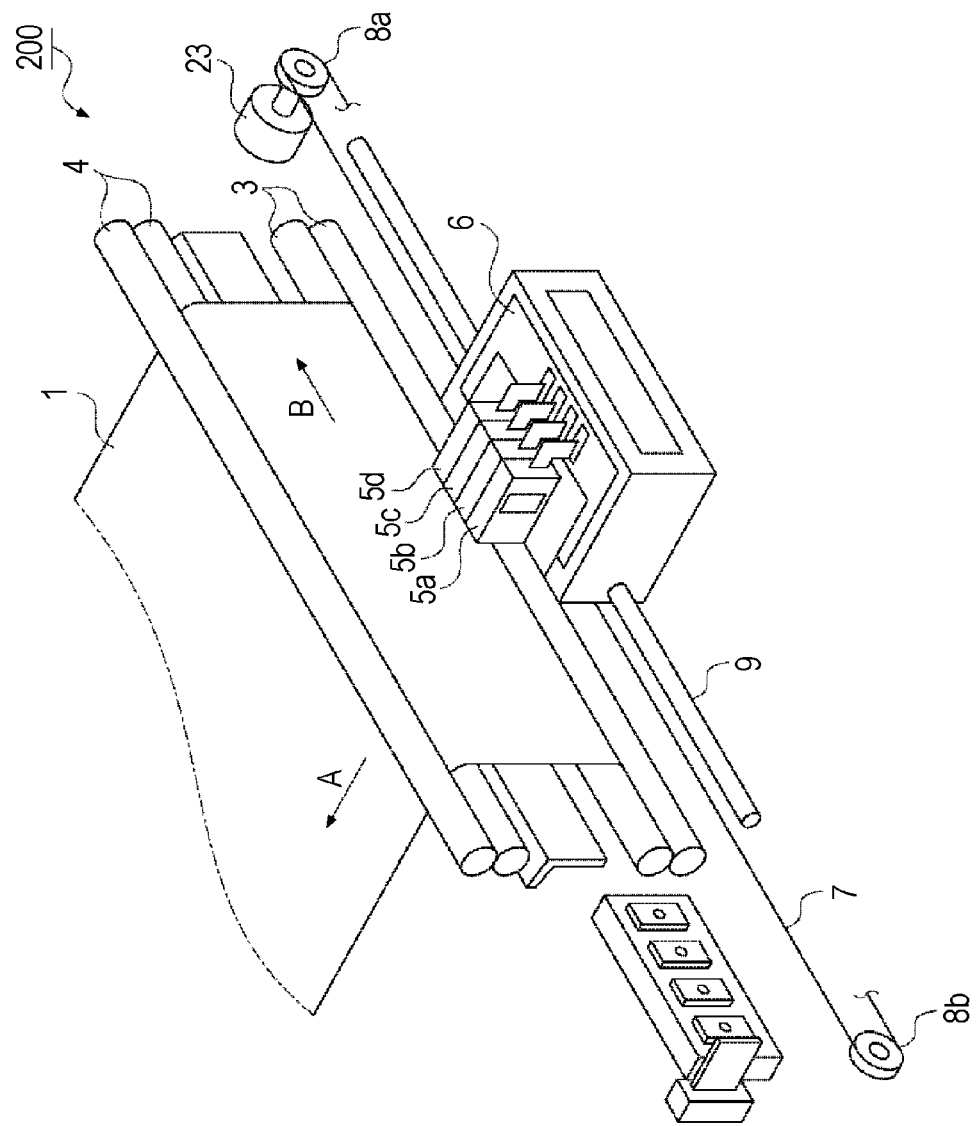
FIG. 2 is a perspective view illustrating an example of the mechanisms of the primary portions of a printer 200 according to an embodiment of the present invention.

FIG. 2 is a schematic perspective view illustrating a mechanical configuration of the printer 200. In FIG. 2, reference numeral 1 denotes a recording medium such as a sheet of paper or a plastic sheet, several sheets of which are stacked in the recording-medium loading unit such as a cassette or the like. During recording, the sheets are separated one at a time by a supply roller (not shown) provided on the recording-medium loading unit, and supplied. The supplied recording media are disposed with a fixed spacing therebetween, and are transported by a predetermined amount in the arrow A direction in the diagram, at a timing according to scanning of the recording head, by a first conveyance roller pair 3 and a second conveyance roller pair 4 which are each driven by separate motors (not shown).

Reference numeral 5 denotes a recording head of an ink-jet method for discharging ink onto a recording medium 1 to perform recording. An ink tank is provided on the recording head 5 in FIG. 2 so as to be integrated with the recording head 5, and the ink stored in the ink tank is supplied to the recording head. Also, the recording head 5 is driven according to a discharge signal according to the recording data, thereby discharging ink from an ink nozzle provided on the recording head. More specifically, an electrothermal transducer is provided at the ink flow path corresponding to each ink nozzle arrayed on the recording head, and using the heat energy generated by this electrothermal transducer, air bubbles are generated in the ink, and the ink is discharged by the pressure of the air bubbles. The recording head 5 and ink cartridges are mounted on a carriage 6. Driving force of a carriage motor 23 is transmitted to the carriage 6 via a belt 7 and pulleys 8a and 8b, thereby enabling back and forth movement of the carriage 6 along a guide shaft 9, and enabling scanning of the recording head.

With the above configuration, the recording head 5 can discharge the ink onto the recording medium 1 according to a discharge signal while scanning in the direction of the arrow B in the diagram (the main scanning direction) so as to form ink dots on the sheet 1 and thus perform recording. The recording head 5 is moved to a home position as necessary, and by performing recovery operations by a discharge recovery device, recovers from discharge malfunctions such as non-discharge due to a clogged nozzle, shifting of the landing positions of the discharged ink drops, and so forth. When the transporting roller pair 3, 4 are driven to synchronize with the recording scanning in the main scanning direction of the recording head 5, the recording medium 1 is transported a predetermined amount (for example, one line worth) in the arrow A direction (sub scanning direction). By repeating the recording scanning in the main scanning direction of the recording head, and the transporting operation in the sub scanning direction of the recording medium, recording an image or the like onto a recording medium 1 can be performed.

Figure 3:
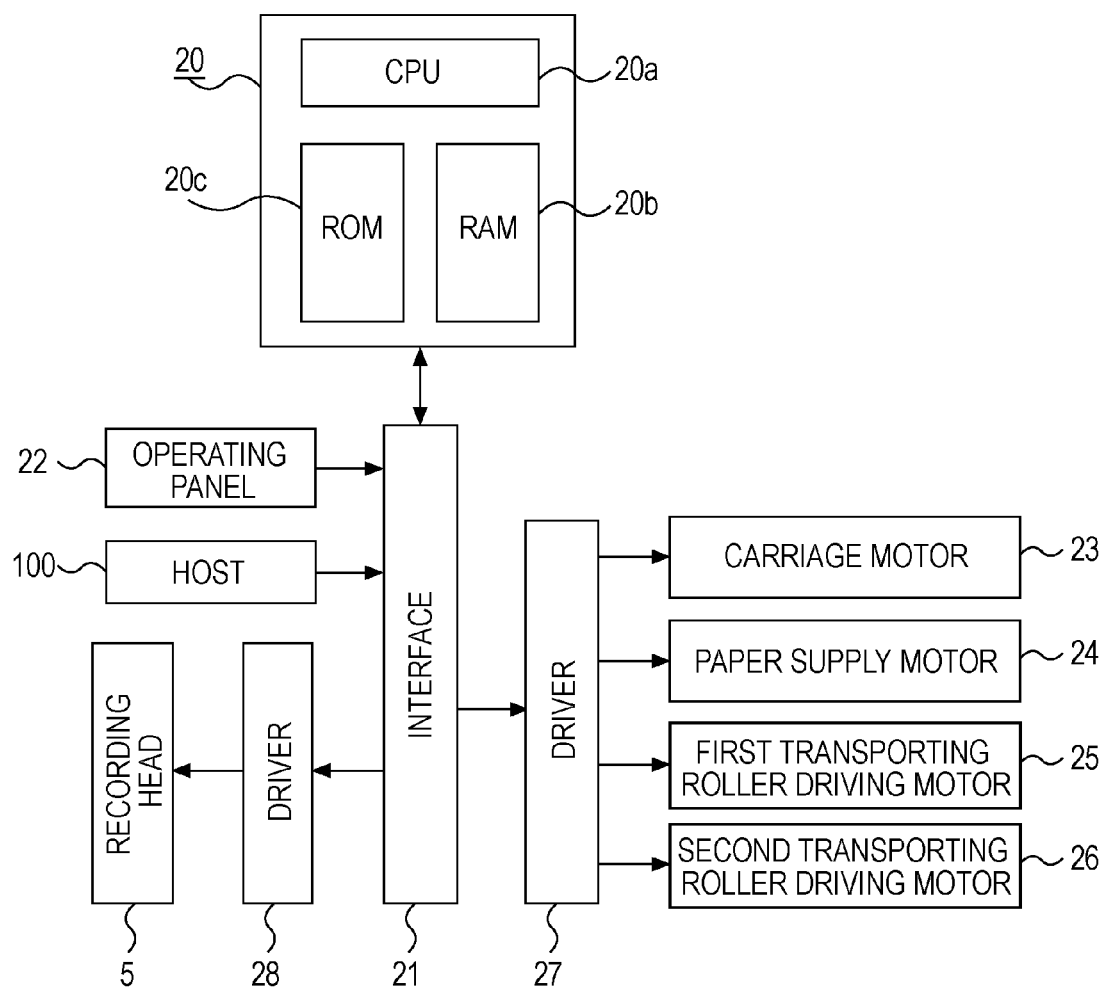
FIG. 3 is a block view illustrating an example of the hardware configuration of the printer 200 according to an embodiment of the present invention.

FIG. 3 is a block diagram showing a control configuration of the printer 200. As shown in FIG. 3, the control unit 20 has a CPU 20a such as a microprocessor or the like, and a ROM 20c storing a control program of the CPU 20a or various data therewithin. Further, the control unit 20 is used as a work area for the CPU 20a, and also has a RAM 20b for performing storage or the like of various data such as recording data or adjustment values or the like. The recording data which is transmitted from the host 100 connected to the printer 200, and received via the interface 21, is stored in the RAM 20b. Further, the printer 200 has an interface 21, operating panel 22, and drivers 27 and 28. The driver 27 drives each motor (a motor 23 for driving the carriage, a motor 24 for driving the paper supply roller, a motor 25 for driving the first transporting roller pair, and a motor 26 for driving the second transporting roller pair), and the driver 28 drives the recording head 5.

With the above configuration, the control unit 20 performs processing for data input/output such as recording data between the host 100 via the interface 21, and processing for inputting various information (for example, character pitch, character type, and so forth) from the operating panel 22. Also, the control unit 20 outputs an ON/OFF signal for driving the motors 23 through 26 via the interface 21, and also outputs the discharge signal or the like to the driver 28, to control ink discharge driving at the recording head.

Next, a recording data generating method will be described, starting with a color conversion method according to the present embodiment.

Color Conversion Processing

Figure 5:
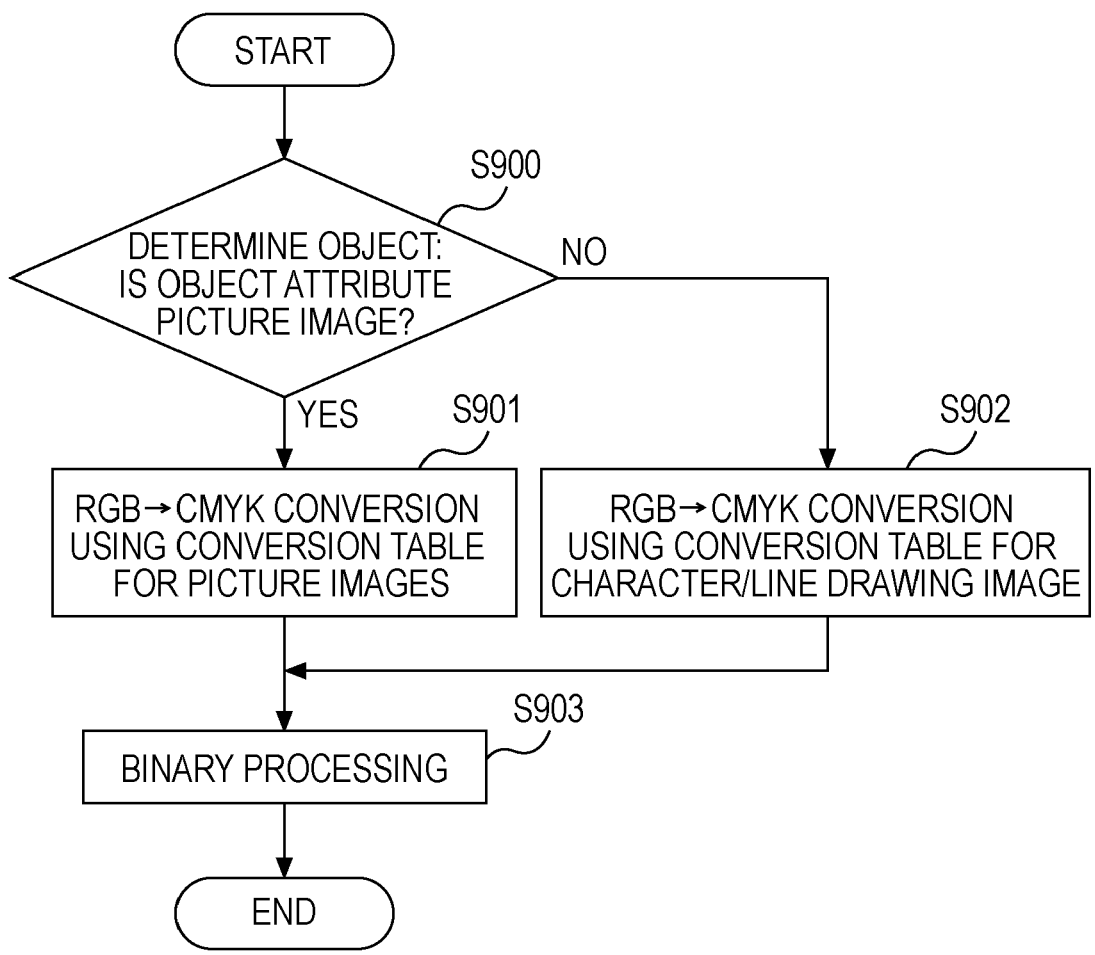
FIG. 5 is a flowchart diagram of color conversion processing.

FIG. 5 is a flowchart of the color converting process according to the present embodiment. When the user gives recording instructions from the program (application) of the host 100 connected to the printer 200, the printer driver installed on the host 100 determines object attributes of the image data (S900). Specifically, the printer driver determines whether the object attributes in a predetermined region of the image data generated with the program (application) is a picture image or a character/line-drawing image. The object attributes are imparted at the time of the image data being generated with the program (application), and the way in which the object attributes are imparted differs from one program to another.

For example, the object attributes are imparted so as to indicate whether the image data in a predetermined region of the image data is picture image data or character image data or line-drawing image data. Also, as another example, the image data may be divided into a character layer, a picture image layer, and a line-drawing image layer, and object attributes of the image data are imparted from the region containing the image data, and the from the layers. Further, an individual object attribute may be imparted by the operating system based on the object attributes imparted by the application. Note that the printer driver can determine the object attributes of a predetermined region of image data generated with the program, by analyzing the image data.

Also, the printer driver can determine object attributes based on drawing commands of operating system or application. Note that the image data generated with the program includes picture images (photograph images), characters, and line drawings. Further, not only files generated by the user with the program, but also data recorded from the printer 200 such as a Web screen displayed via a network or a photograph image captured by a camera can also serve as image data. Picture image data refers to image data such as photographs or pictorial art. Line drawings refer to graphic images drawn with lines, such as outlines, geometric shapes, or CAD drawings.

Figure 6A:
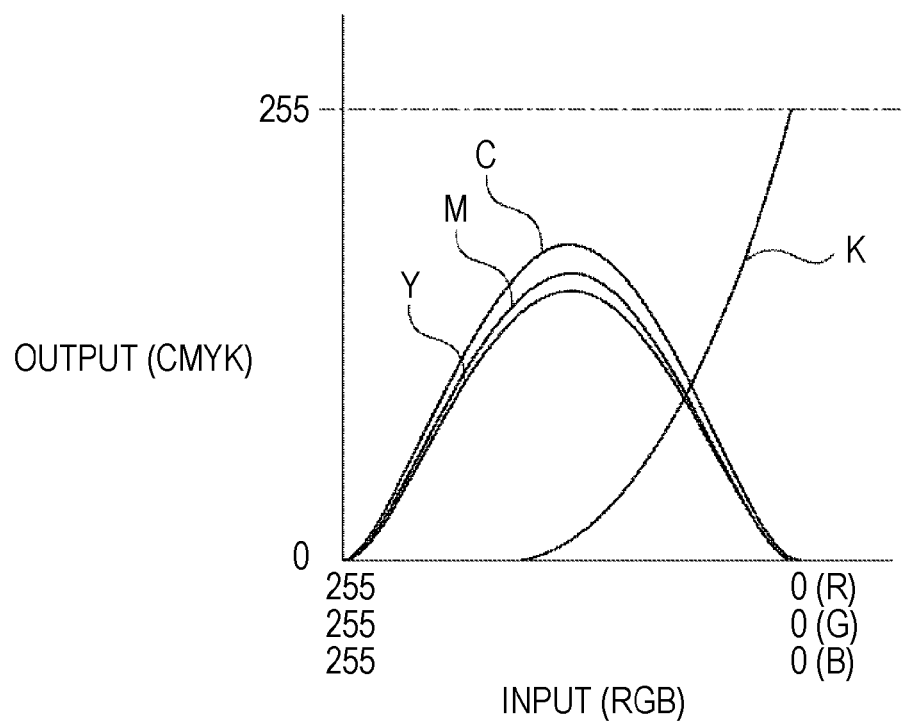
FIGS. 6A and 6B are diagrams illustrating a conversion table used for color conversion processing.
Figure 6B:
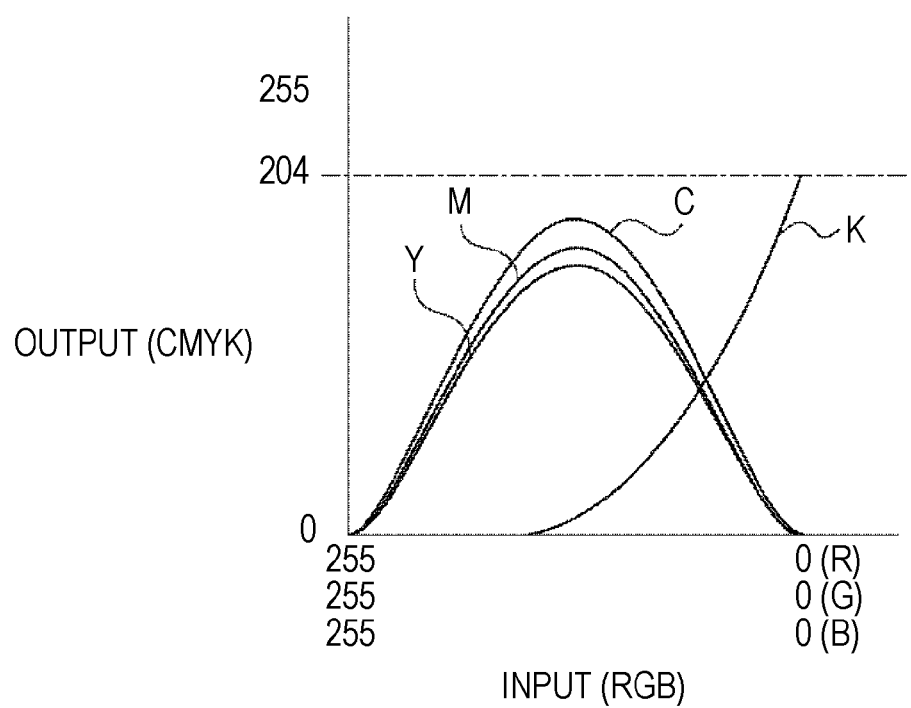

In step S900, if the object attributes are determined to be a picture image, color conversion processing from RGB to CMYK is performed, using the conversion table (LUT) for picture images in FIG. 6B. Also, in S900, if the object attributes are determined to be a character/line drawing image, color conversion processing is performed using the conversion table for character/line drawing images in FIG. 6A. FIG. 6A shows an example of a grayline conversion table (LUT) used in the event of performing color conversion processing. The horizontal axis of the conversion table shows the color displayed with the RGB of the image data, and moving farther left (the closer to R=255, G=255, B=255) indicates more white, and moving farther right (R=0, G=0, B=0) indicates more black. Also, the vertical axis shows the color displayed with CMYK of the image data. Color conversion processing obtains the respective values of CMYK as output values, which correspond to the respective RGB of the image data serving as the input values. For example, as shown in FIG. 6A, when an 8-bit signal value R=G=B=0 (the color of the image data is black) is the input value, this is converted to an output value showing as C=0, M=0, Y=0, K=255. Note that in FIGS. 6A and 6B, the conversion table of a graph format is used for the RGB→CMYK for the conversion processing, but a conversion table in which the corresponding values have been compiled in a chart format may also be used. Further, FIGS. 6A and 6B show the conversion table in two dimensions, but it is possible to use a table shown in three dimensions.

In FIGS. 6A and 6B, the conversion curves for CMY are the same, but the K conversion line differs. With FIG. 6A which is the conversion table for character/line drawings, the value of K is converted to the maximum value of 255 when the black portion of the image data expressed with RGB is converted to CMYK. On the other hand, with FIG. 6B which is the conversion table for picture images, the value of K is converted to 255×0.8≈204 which is a value of approximately 80% of the maximum value of 255, when converting the black portion of the image data represented in RGB into CMYK. With the conversion table for picture images, by setting the maximum value of the K conversion curve to be lower than the K conversion curve for character/line drawings, the black density can by lowered in the event of recording picture images. Note that with FIGS. 6A and 6B, the same CMY conversion curves are used, but a conversion table with different conversion curves may be used.

Figure 4A:
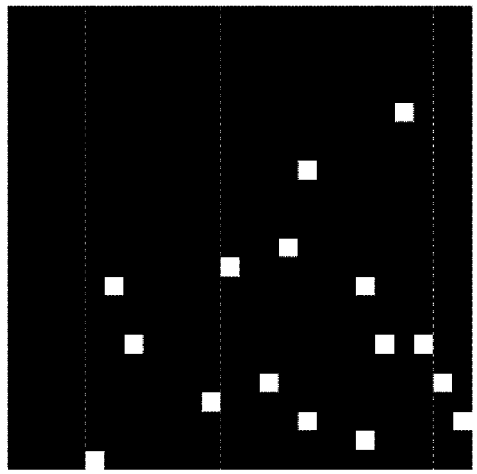
FIGS. 4A through 4D are diagrams describing a conventional example.
Figure 4B:
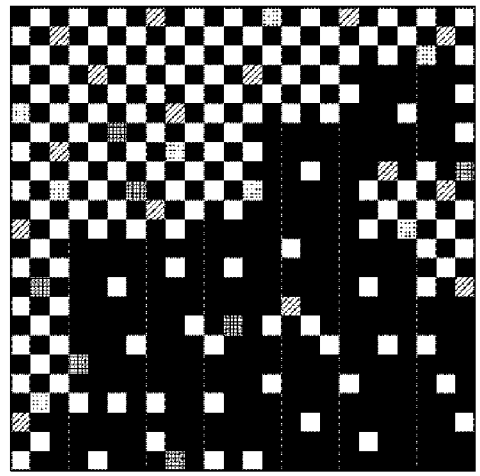
Figure 4C:
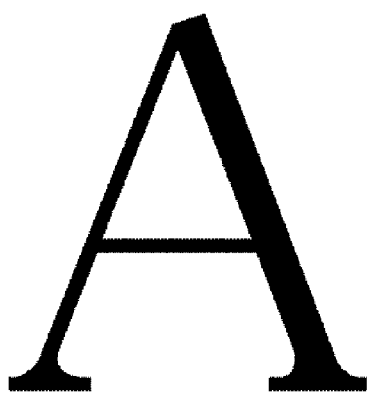
Figure 4D:
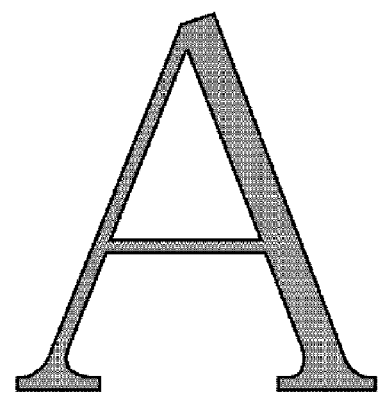
Figure 7A:
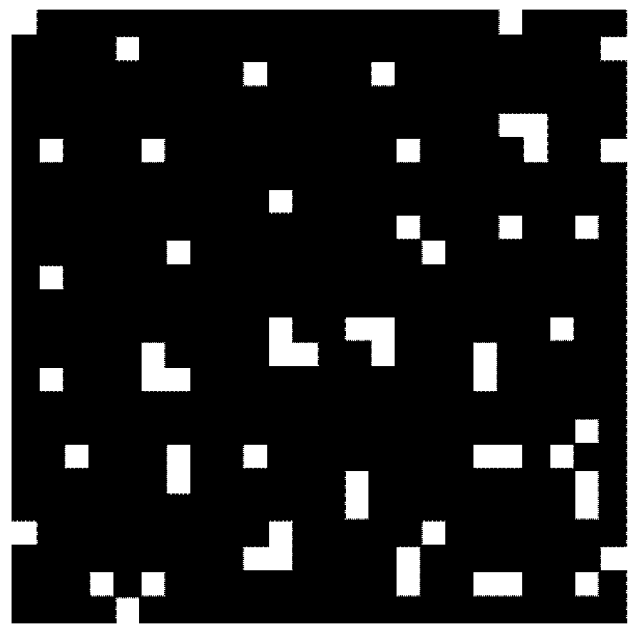
FIGS. 7A and 7B are diagrams illustrating a picture image with application of an embodiment of the present invention.
Figure 7B:
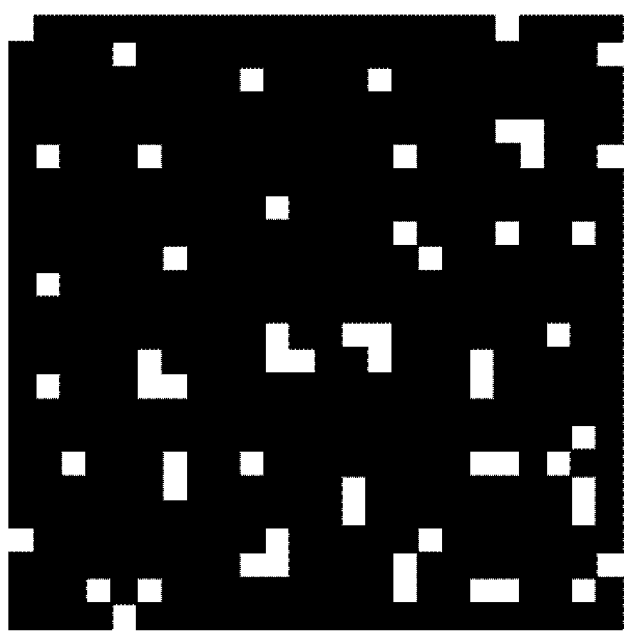

Next, binary processing is performed (S903) as to the CMYK output value converted in S901 and S902. By performing binary processing, recording data can be generated which shows whether or not ink drops are to be discharged from the recording head, corresponding to the position of the recording head as to the recording medium. Note that following RGB→CMYK conversion of the picture image shown in FIG. 4A using the conversion table in FIG. 6A, the recording data when performing binary processing becomes the same as in FIG. 4A. However, following RGB→CMYK conversion of the picture image in FIG. 4A using the conversion table in FIG. 6B, the recording data when performing binary processing becomes the same as in FIG. 7A. This is because the black conversion curve in the conversion table in FIG. 6B is set to have a low black density. Since the conversion curve is such that the black density becomes low, recording data is generated wherein blank dots are increased compared to the original picture image in FIG. 4A. Based on the recording data in FIG. 7A, processing to decrease the smearing/border bleeding to be described later (processing such as imparting color dots or reducing black dots, or the like) is performed, and the pictured image data thus generated is shown in FIG. 7B. The black dots surrounding the blank dots in FIG. 7A are all determined to be an edge portion of a region wherein black is discharged, and therefore the picture image data in FIG. 7B is not subjected to imparting of color ink or reduction of black ink for smearing reduction. Consequently, a picture image can be output without deteriorating the gradient thereof.

Thus, in the event of subjecting the image data to RGB→CMYK conversion, by setting the individual conversion tables for the different objects, black images such as characters or line drawings can retain the sharpness and clearness thereof, and picture images can be formed as high-quality images. At this time, the conversion table of an object wherein the black image such as characters or line drawings is desired to be expressed clearly is set so that an edge portion and a non-edge portion of the black image exist. Further, the conversion table of an object wherein reduction of lower recording quality due to deteriorated gradients is desired as with a picture image is configured only with the edge portions of the black image, and is set such that non-edge portions do not exist. Thus, the black image is clearly recorded with the edge portions of the black image, and the occurrence of smearing is reduced with the non-edge portions of the black image. Note that with the edge portions of the black image, in the event that this is adjacent to a region wherein color ink is imparted, the processing for decreasing border bleeding is given preference, and so color ink may be imparted.

Also, with the above description, with an object such as a character or line drawing, the configuration is such that the black dots at the non-edge portions are reduced, but a high recording density of characters or line drawings can be realized without reducing the black dots.

Further, with the above description, the configuration is such that the color conversion table for characters or line drawings differ from the color conversion table of a picture image, but the color conversion tables used for character images and line drawing images may also be arranged to be different.

FIG. 8 shows a block diagram describing the flow for printing data generation for performing processing to reduce smearing/border bleeding, based on the recording data subjected to binary processing. With FIG. 8, printing data is generated by performing detection of black-dot proximity pixels, detection of color-dot proximity pixels, generation of color-dot imparting data, and generation of black reduction image data. Note that the detailed descriptions relating to each of these will be described later.

First, of the recording data subjected to binary processing, black regions needing color dots to be imparted are detected in order to decrease the occurrence of smearing at the regions wherein black ink is discharged. Therefore, using the K (Bk) recording data (original Bk data D1000) is used to detect whether or not there are many pixels discharging black ink in the proximity of predetermined black pixels. This process is called black-dot proximity pixel detection processing (E1000). Next, data is generated (black-dot proximity pixel data D1001) for a region wherein there are many pixels discharging black ink.

Next, using OR data (D1008) of original C, M, Y having taken the logical sum of the original C data (D1005), original M data (D1006), original Y data (D1007), and original Bk data (D1000), detection processing (E1004) of color-dot proximity pixels to which color dots are to be imparted in order to prevent border bleeding, and thus color-dot proximity pixel data (D1009) is generated.

By using the black-dot proximity pixel data (D1001) and original Bk data (D1000) to perform detection processing (E1008) of the black-dot non-proximity pixels, black-dot non-proximity pixel data (D1017) is generated.

By taking the logical product of a Bk reduction mask (E1009) as to the black-dot proximity pixel data (D1001), Bk non-edge reduction data (D1018) is generated.

By taking the logical product of C mask 1 (E1001), M mask 1 (E1002), and Y mask 1 (E1003) as to the black-dot proximity pixel data (D1001), the C-imparted data 1 (D1002), M-imparted data 1 (D1003), and Y-imparted data 1 (D1004) is generated.

By taking the logical product of C mask 2 (E1005), M mask 2 (E1006), and Y mask 2 (E1007) as to the color-dot proximity pixel data (D1009), the C-imparted data 2 (D1001), M-imparted data 2 (D1011), and Y-imparted data 2 (D1012) is generated.

By taking the logical sum of the black-dot non-proximity image data (D1017) and the Bk non-edge reduction data (D1018), the printing Bk data (D1016) is generated.

By taking the logical sum of the original C data (D1005) and the C-imparted data 1 (D1002) and the C-imparted data 2 (D1010), the printing C data (D 1013) is generated. By performing similar processing, the printing M data (D1014) and printing Y data (D1015) is generated. Using the printing data for each of the colors, an image is formed by the printer.

Detection Processing of Pixels for Color-Dot Imparting

Detection of Black-Dot Proximity Pixels for Smearing Prevention

Figure 9:
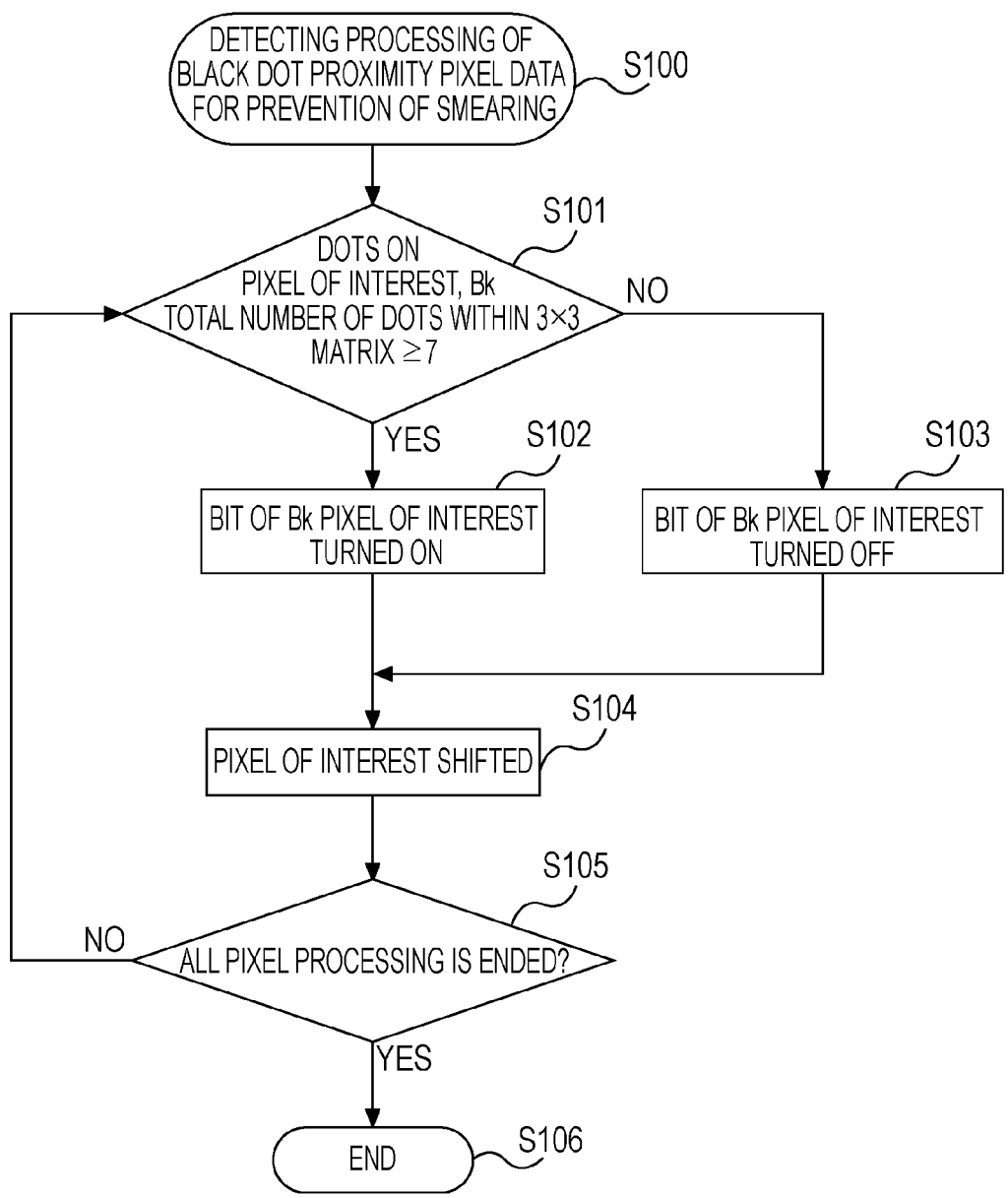
FIG. 9 is a flowchart diagram of detection processing of pixels for color dots imparted for prevention of smearing.

FIG. 9 is a flowchart of the detection processing of black-dot proximity pixels for smearing prevention. Determination is made as to whether black dots exist on the pixel of interest, and whether the total number of black dots existing within the 3×3 matrix is 9 (S101). In the event the total number of black dots is 9, the bit for the pixel of interest is turned ON (S102). If not, the bit for the pixel of interest is turned OFF (S103). Subsequently, the pixel of interest is shifted (S104). If all of the data has finished, this serves as the end (S105), and otherwise the above processing is repeated. Here, the threshold of the total number of black dots is set to be 9, but an optimal value should be used to match the features of the ink or the features of the recording device.

Figure 10A:
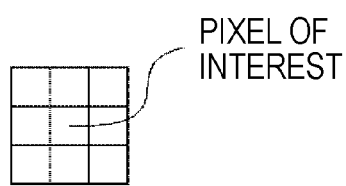
FIGS. 10A through 10C are diagrams of a detection example of pixels for color dots imparted for prevention of smearing.
Figure 10B:
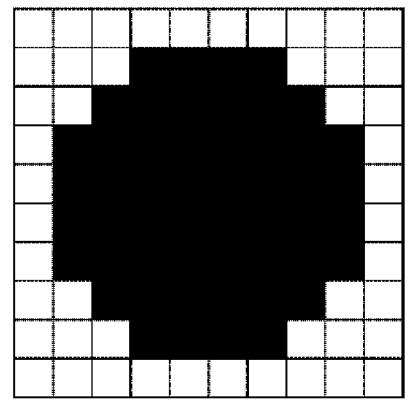
Figure 10C:
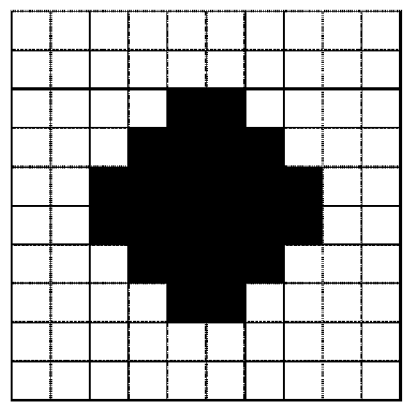

FIGS. 10A through 10C are diagrams showing an example of black-dot proximity pixels detecting. FIG. 10A shows a 3×3 matrix with the pixel of interest at the center thereof. FIG. 10B is a black original image. Processing is performed as to the black original data while shifting the 3×3 matrix one pixel at a time in order. If the bit for the pixel of interest is turned ON in the event that the total number of black dots within the matrix is 9, a black-dot proximity pixel for smearing prevention can be detected, as shown in FIG. 10C.

As can be clearly understood from FIG. 10C, with this processing, only a region wherein comparative duty of black is high can be detected. The edge regions wherein comparative duty is low is not detected, and therefore color dots are not imparted, thus maintaining sharpness of the black image.

Detecting of Color-Dot Proximity Pixels for Bleeding Prevention

Figure 11:
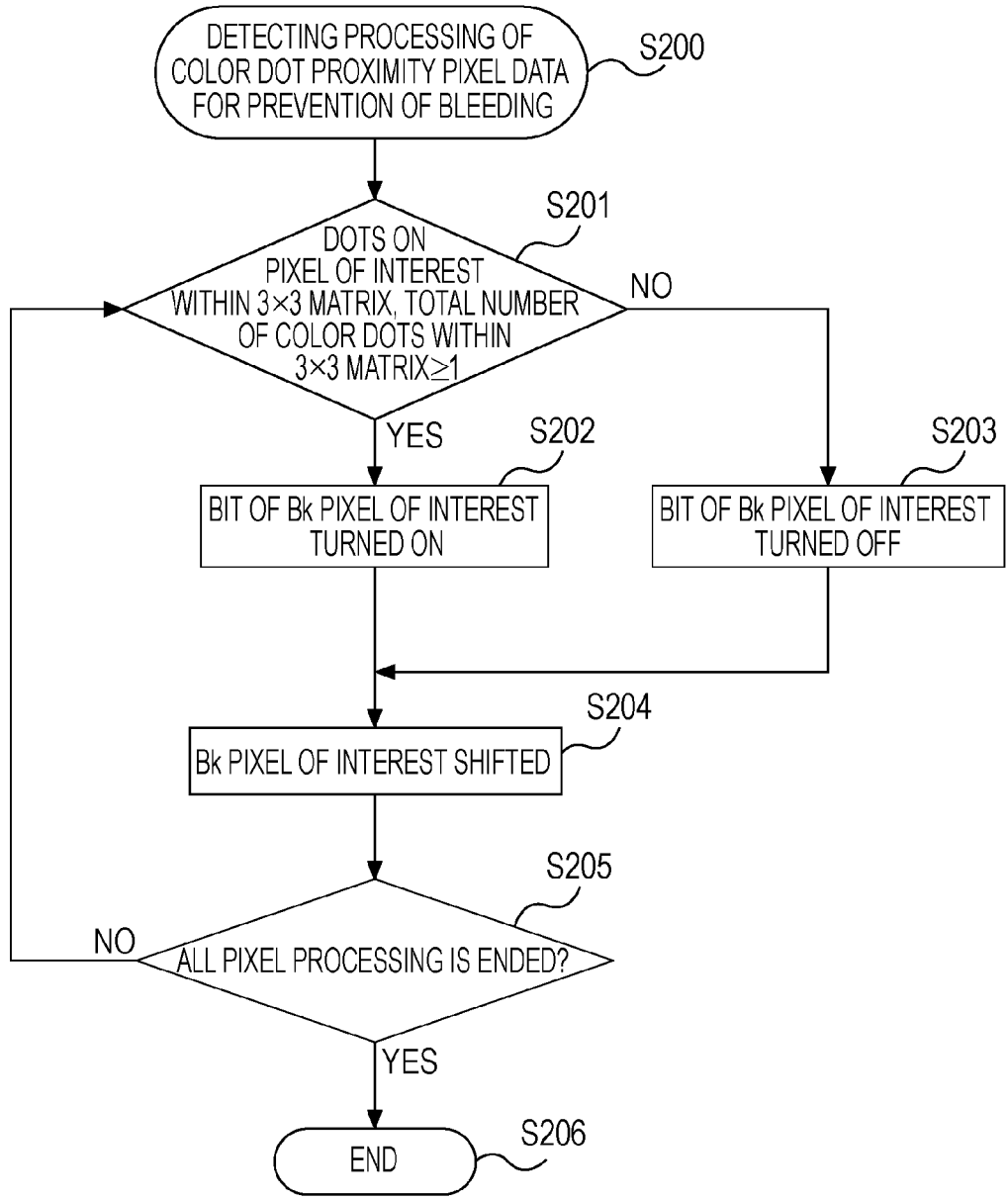
FIG. 11 is a flowchart diagram of detection processing of pixels for color dots imparted for prevention of bleeding between black and color.

FIG. 11 is a flowchart showing detection processing of color-dot proximity pixels for bleeding prevention of black and color.

Determination is made as to whether black dots exist on the pixel of interest, and whether the total number of color dots existing within the 3×3 matrix is 1 or more (S201). In the event the total number of color dots is 1 or more, the bit for the pixel of interest is turned ON (S202). If not, the bit for the pixel of interest is turned OFF (S203). Subsequently, the pixel of interest is shifted (S204). If all of the data has finished, this serves as the end (S205), and otherwise the above processing is repeated. Here, the threshold of the total number of color dots is set to be 1, but an optimal value should be used to match the features of the ink or the features of the recording device.

Figure 12A:
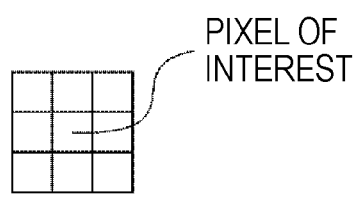
FIGS. 12A through 12D are diagrams of a detection example of pixels for color dots imparted for prevention of bleeding.
Figure 12B:
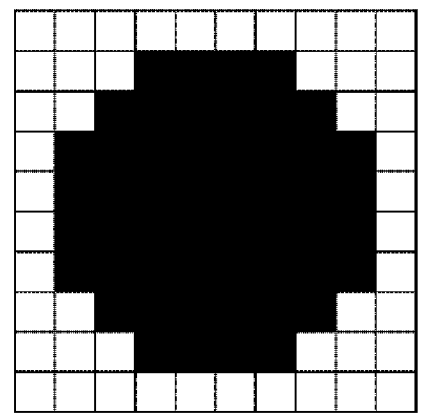
Figure 12C:
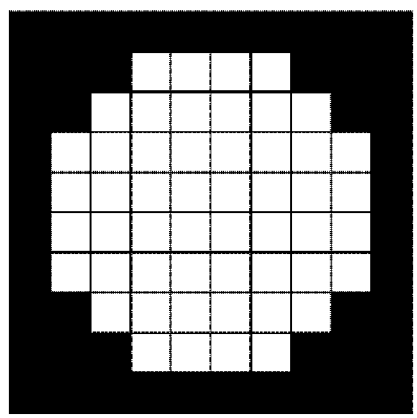
Figure 12D:
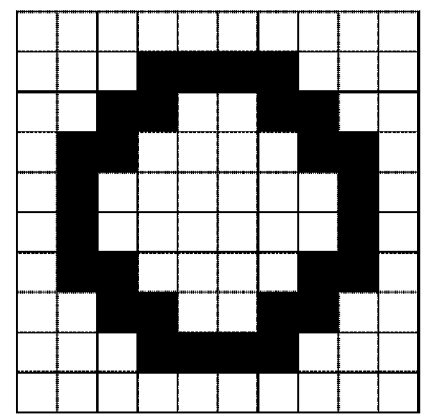

FIGS. 12A through 12D are diagrams showing an example of color-dot proximity pixels detecting for bleeding prevention. FIG. 12A shows a 3×3 matrix with the pixel of interest at the center thereof. FIG. 12B is a black original image, and FIG. 12C is a color original image. Processing is performed for each black pixel of the black original data with respect to the color original data while shifting the 3×3 matrix one pixel at a time in order. The bit for the pixel of interest is turned ON in the event that the total number of color dots within the matrix is 1 or more. In this way color-dot proximity pixel for bleeding prevention can be detected, as shown in FIG. 12D.

As can be clearly understood from FIG. 12D, with this processing, only a border region of black and color can be detected. By imparting color dots at the border region, border bleeding can be prevented. Generating of black-dot non-proximity pixels (Bk edge unit)

Figure 13A:
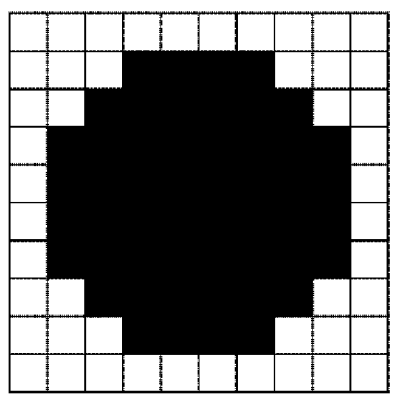
FIGS. 13A through 13C are diagrams of a detection example of black dot non-proximity pixels.
Figure 13B:
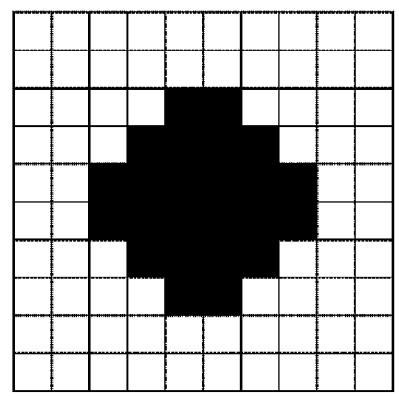
Figure 13C:
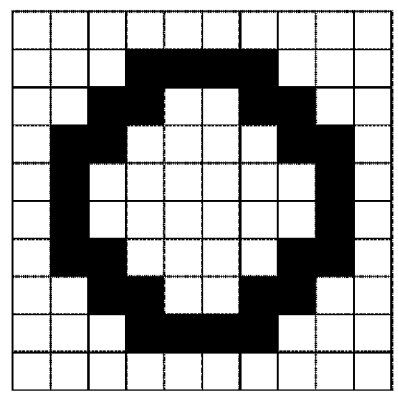

FIGS. 13A through 13C show a detection example of black-dot non-proximity pixels. FIG. 13B shows the black-dot proximity pixel (Bk solid portion) data, and FIG. 13A shows the original black data. By taking the logical product of the inverse data of the black-dot proximity pixel data (Bk solid portion) and the original black data, the black-dot non-proximity pixel (Bk edge portion) data shown in FIG. 13C can be generated.

Generating of Color Dot-Imparted Data

Generating of Color Dot-Imparted Data for Smearing Prevention

Figure 14A:
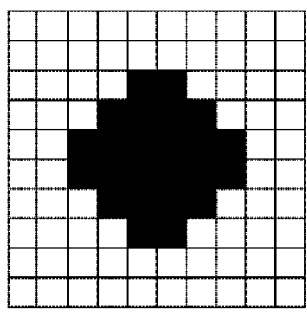
FIGS. 14A through 14G are diagrams of an example of generating data for color dots imparted for prevention of smearing.
Figure 14B:
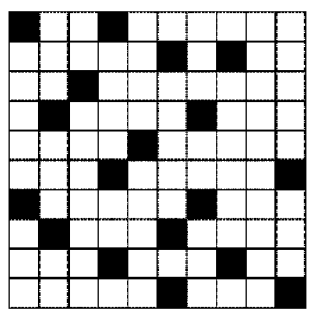
Figure 14C:
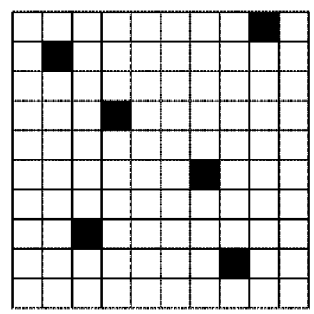
Figure 14D:
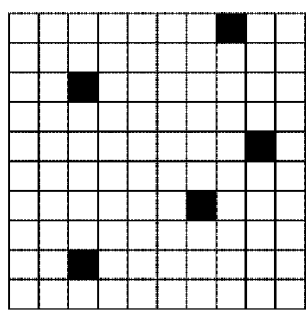
Figure 14E:
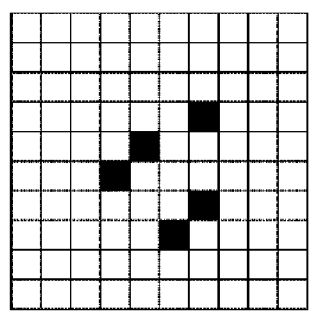
Figure 14F:
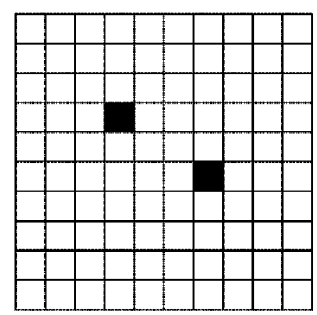
Figure 14G:
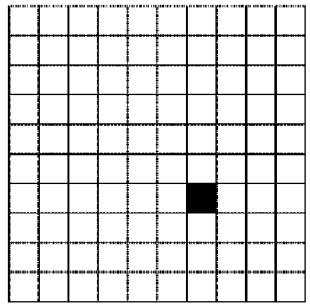

FIGS. 14A through 14G show an example of generating color dot-imparted data for smearing prevention. FIG. 14A shows black-dot proximity pixel data. FIGS. 14B through 14D show the mask 1 for cyan, magenta, and yellow for generating a predetermined amount of imparted data. Let us say that the ratio of imparted data amount for each color is 18% cyan, 6% magenta, and 5% yellow. By taking the logical product of the black-dot proximity pixel data and the mask 1 of each color, the imparted data for each color shown in FIGS. 14E through 14G is generated. Here, the imparted data amount and the mask size for each color should be taken as an appropriate value according to the ink features or the configuration of the recording device. Also, the way in which the dots are arrayed within the mask may have regularity, or may be pseudo-random.

Generating Color Dot-Imparted Data for Bleeding Prevention

Figure 15A:
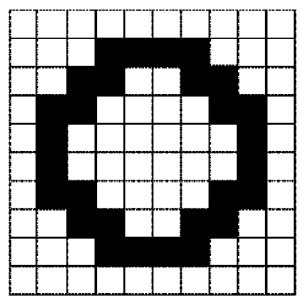
FIGS. 15A through 15G are diagrams of an example of generating data for color dots imparted for prevention of bleeding.
Figure 15B:
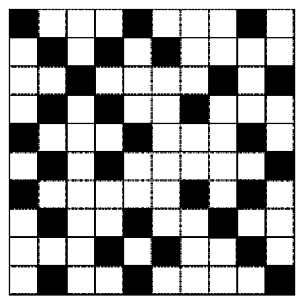
Figure 15C:
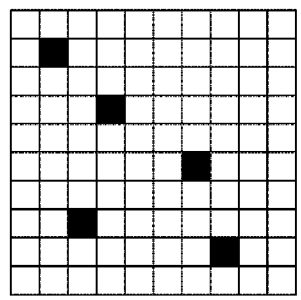
Figure 15D:
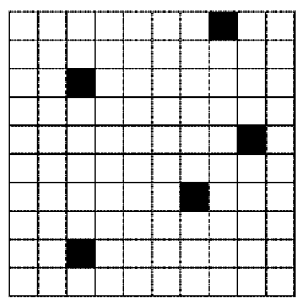
Figure 15E:
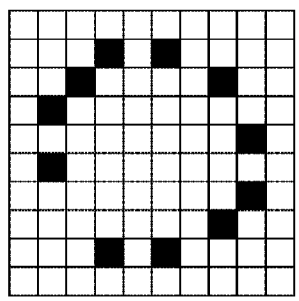
Figure 15F:
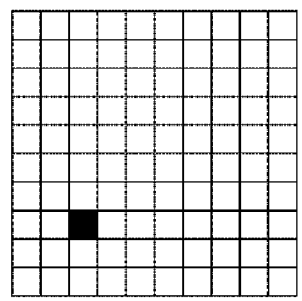
Figure 15G:
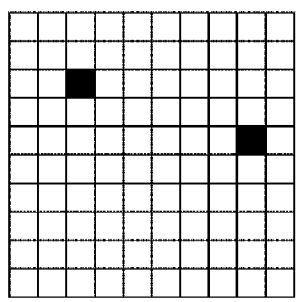

FIG. 9 shows an example of generating color dot-imparted data for bleeding prevention. FIG. 15A shows color-dot proximity image data. FIGS. 15B through 15D show the mask 2 for cyan, magenta, and yellow for generating a predetermined amount of imparted data. Let us say that the ratio of imparted data for each color is 30% cyan, 5% magenta, and 5% yellow. By taking the logical product of the color-dot proximity pixel data and the mask 2 of each color, the imparted data for each color shown in FIGS. 15E through 15G is generated. Here, the reason for a relatively large amount of cyan imparted data is that only cyan ink is reactive as to black ink, and a recording device with a coagulating type of ink system is assumed to be used. The imparted data amount and the mask size for each color should be taken as an appropriate value according to the ink features or the configuration of the recording device. Also, the way in which the dots are arrayed within the mask may have regularity, or may be pseudo-random.

Decimation Processing of Black-Dot Non-Proximity Image Data

Figure 16A:
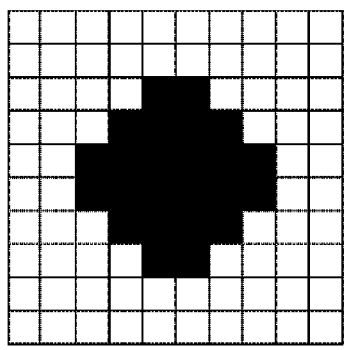
FIGS. 16A through 16C are diagrams of an example of generating Bk non-edge reduction data of black-dot non-proximity pixels.
Figure 16B:
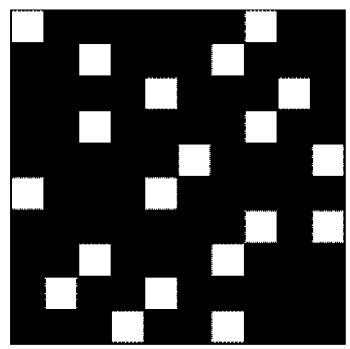
Figure 16C:
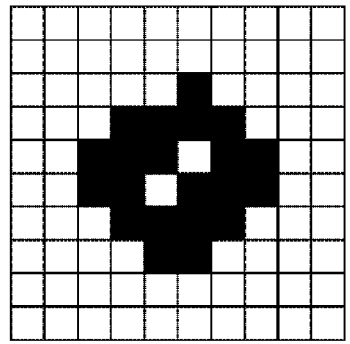

FIGS. 16A through 16C show an example of black dot proximity image data. FIG. 16A shows black dot proximity image data. By taking the logical product of the black dot proximity image data and the black reduction mask shown in FIG. 16B, the Bk non-edge reduction data shown in FIG. 16C is generated.

Generating of Printing Color Data

Figure 17:
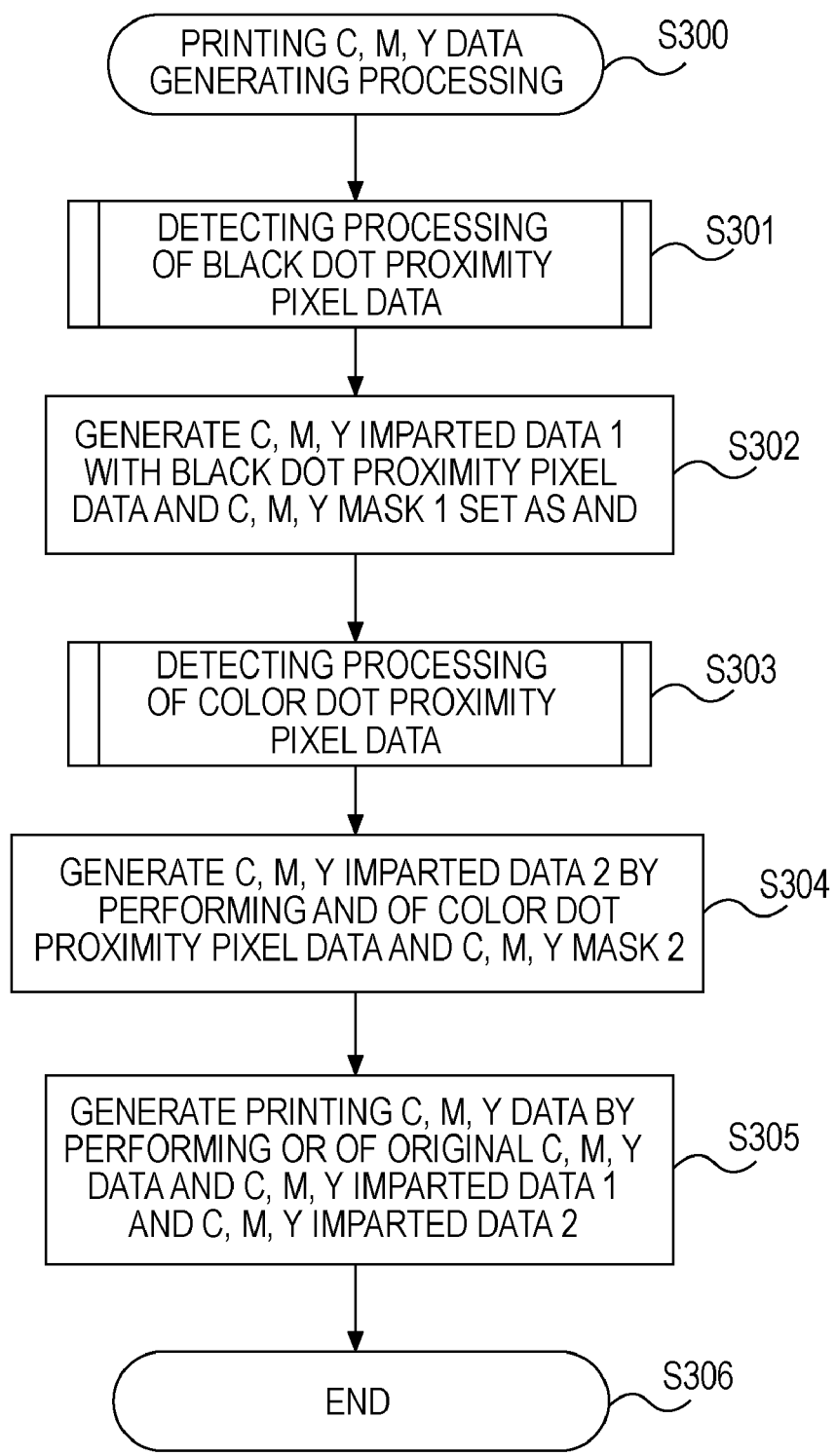
FIG. 17 is a flowchart diagram of generation processing of printing color data.

FIG. 17 is a flowchart showing the generation process of printing color data. The black-dot proximity pixel data is detected (S301). Subsequently, by taking the logical product of the black-dot proximity pixel data and the mask 1 for cyan, magenta, and yellow, the cyan, magenta, and yellow imparted data 1 is generated (S302). Next, the color-dot proximity pixel data is detected (S303), and, by taking the logical product of the mask 2 for cyan, magenta, and yellow, the cyan, magenta, and yellow imparted data 2 is generated (S304). Finally, the logical sum of the original cyan, magenta, and yellow data and the imparted data 1 of each color and the imparted data 2 of each color is taken, and the printing cyan, magenta, and yellow data is generated (S305).

Generating of Printing Black Data

Figure 18:
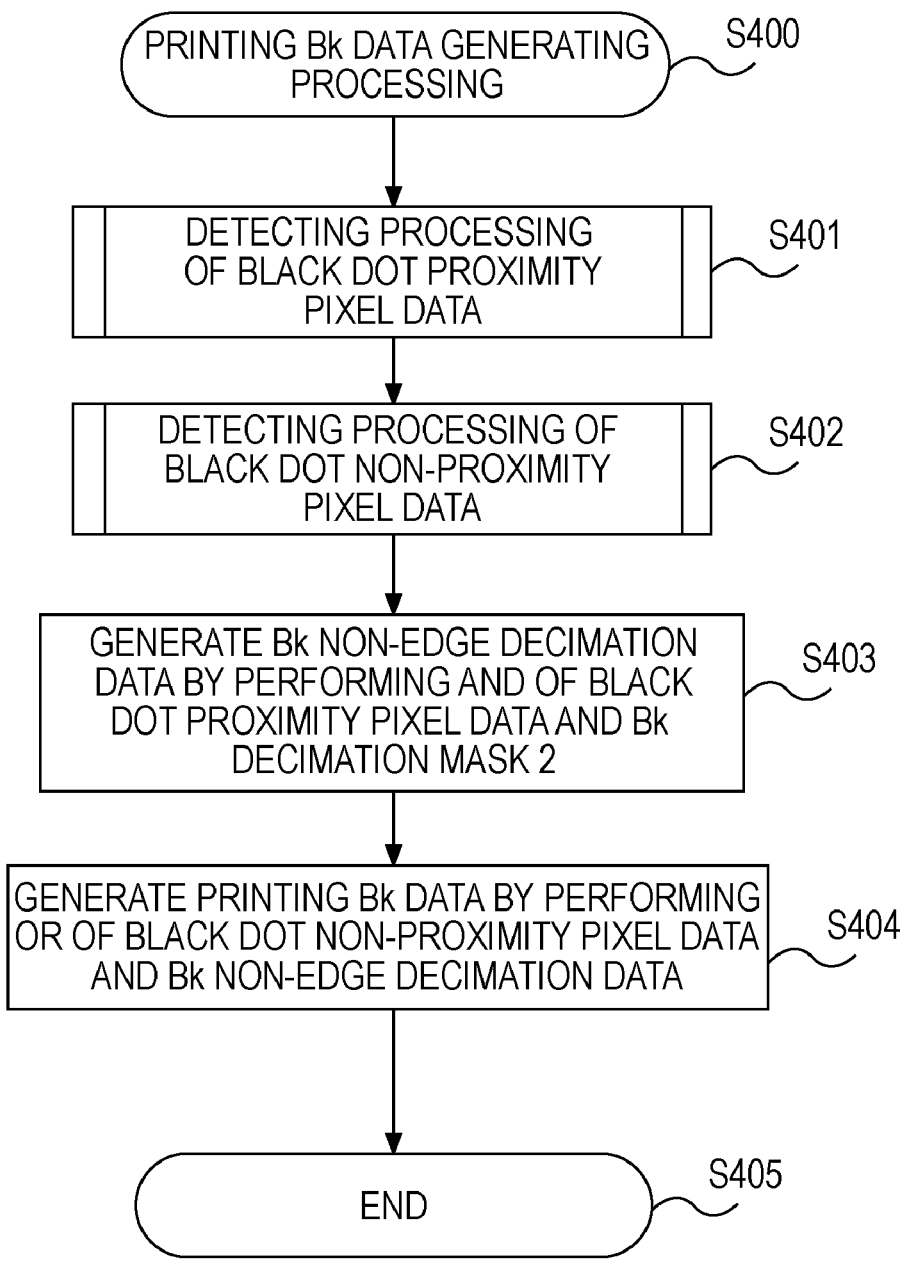
FIG. 18 is a flowchart diagram of generation processing of printing black data.

FIG. 18 is a flowchart showing the generation process of printing black data. The black-dot proximity pixel data is detected (S401). Subsequently, the black-dot non-proximity image data is detected (S402). By taking the logical product of the black-dot proximity pixel data and the Bk reduction mask, the Bk non-edge reduction data is generated (S403). Finally, the logical sum of the black dot non-proximity image data and the Bk non-edge decimation data is taken, and the printing black data is generated (S404).

As a result of the above color conversion processing, black dot proximity image data is detected in character or line-drawing images, and black dot proximity image data is not detected in picture images.

Consequently, black characters or black line printing can be improved with regard to sharpness and smearing, and recording can be performed without deterioration of gradients as to picture images.

Also, an ink-jet recording device can be provided enable optimum processing, even in the case wherein attribute information of an object is missing, in the event of detecting black pixels wherein black dots and color dots are close to each other, as in image data. At this time, optimum processing is performed on the edges and non-edges of the black image, as with an object wherein sharpness of the printing results is important, and an object wherein gradients are important. If the bit data for each of these images holds the object attribute information, determination can be made as to whether edge processing is necessary or not. In order for the various high-resolution bit data to hold the object attribute information, a large amount of memory is required, and also time is required for determining whether or not edge processing is needed. Thus, with the present embodiment, due to reasons such as image quality decreasing by performing edge processing and non-edge processing, an image is generated so that a non-edge region is not generated for an object not requiring edge processing. Consequently, there is no non-edge region, and so recording is enabled without decreasing image quality of a region for imparting black.

Note that with the present embodiment, the printer driver is configured to determine object attributes of the image data of the predetermined region, based on the object attributes imparted by the application. A configuration may be made wherein, in the event that object attributes are not imparted by the application, or in the event that object attributes imparted by the application cannot be confirmed, the printer driver determines the object attributes. Specifically, the object attributes can be determined, based on the ratio (Duty) of black ink imparted and the ratio (Duty) of color ink imparted for a predetermined region as to image data transmitted from the host computer. For example, in the case that the ratio of black ink imparted and the ratio of color ink imparted are both low, this can be determined to be character image data or line-drawing image data. Also, in the case that the ratio of black ink imparted is low but the ratio of color ink imparted is high, this can be determined to be picture data. Note that in the case that the ratio of black ink imparted is comparatively low and the ratio of color ink imparted is of a medium range, this can be determined to be line-drawing image data.

Also, with the present embodiment, in the case that the object attributes are picture images, processing has been performed so that there are not non-edge portions in the black image so that color ink is not imparted as to the region wherein black ink is imparted, but a configuration may be made wherein color ink is imparted. For example, depending on recording conditions such as recording mode or types of recording media, color ink may be imparted even if the image quality is somewhat lowered, in order to preference the improvement of black-ink fixing or the decrease of bleeding. For recording conditions wherein such improvement of black ink fixing or the decrease of bleeding is given higher priority, a condition may be given such as giving higher priority to recording speed over image quality. Such a recording condition would be a case of performing recording with comparatively few recording head scans (for example, twice), or recording performed as to a recording medium with poor ink absorption (for example, plain paper). Thus, even if the object attributes are a picture image, the black image reduction amount can be made to differ so that the color-ink imparted amount on a black image differs according to recording conditions.

Second embodiment

Here, the signal values of K, C, M, Y as to R=G B=0 is set at a table value to be converted to the following values as to a picture image. K=255×0.8≈204, C=255×0.18≈46, M=255× 0.06≈15, Y=255 0.05≈13. On the other hand, for characters and line-drawing images, the table values are set to convert to K=255, C=0, M=0, Y=0.

Thus, the conversion table should be set to a table wherein appropriate values are taken according to needs such as ink composition or recording medium ink absorption, recording mode, recording speed, and so forth.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-113446 filed Apr. 17, 2006 and No. 2007-061725 filed Mar. 12, 2007, which are hereby incorporated by reference herein in their entirety.

What is claimed is:

1. An ink-jet recording device for printing images based on image data using a recording head, said ink-jet recording device comprising:
   a determining unit configured to determine object attributes of said image data;
   a storing unit configured to store a plurality of conversion tables for conversion from a RGB color expression to a YMCK color expression;
   a color conversion unit configured to convert color using a predetermined conversion table of said plurality of conversion tables, according to the object attributes determined by said determining unit;
   a generating unit configured to generate non-proximity pixel data using proximity pixel data and original data; and
   a reduction unit configured to reduce black image data of a non-edge portion of an area formed by using black ink,
   wherein the non-edge portion is specified by the non-proximity pixel data,
   wherein said color conversion unit is configured to differentiate between a conversion table for use in color conversion of a picture image, and a conversion table for use in color conversion of a character image,
   wherein in the case of said image data object attribute being a picture image, said color conversion unit is configured to use a conversion table wherein the black region of the picture image converted to YMCK color expression is smaller than the black region of the picture image of RGB color expression before conversion, and
   wherein said reduction unit performs the same reduction process, regardless of the object attributes.

2. The ink-jet recording device according to claim 1, wherein said color conversion unit is configured to differentiate between a conversion table for use in color conversion of a picture image, and a conversion table for use in color conversion of a line drawing.

3. The ink-jet recording device according to claim 1, further comprising:
   a color ink imparting unit configured to impart a predetermined amount of color ink on the non-edge portion of a region of an image using black ink, of the image data with YMCK color expression which has been converted with said color converting unit;
   wherein said color ink imparting unit is configured so that the amount of said imparted color ink differs according to the object attributes determined by said determining unit.

4. The ink-jet recording device according to claim 3, configured to impart, with said color ink imparting unit, less color ink to the non-edge portion of a picture image than to the non-edge portion of a character image.

5. The ink-jet recording device according to claim 3, configured so that in a case that the object attribute is a picture image, said color conversion unit performs color conversion using a conversion table different than one used for an edge region.

6. The ink-jet recording device according to claim 1, configured so that in the case that the object attribute is a picture image, said color conversion unit performs color conversion using a conversion table whereby the density of black is lowered.

7. An image-processing device for generating recording data based on image data wherein a plurality of pixels including pixels with black data and color data are arrayed, said image-processing device comprising:
a determining unit configured to determine object attributes of said image data;
a storing unit configured to store a plurality of conversion tables for conversion from a RGB color expression to a YMCK color expression;
a color conversion unit configured to convert color using a predetermined conversion table of said plurality of conversion tables, according to the object attributes determined by said determining unit;
a generating unit configured to generate non-proximity pixel data using proximity pixel data and original data; and
a reduction unit configured to reduce black image data of a non-edge portion of an area formed by using black ink,
wherein the non-edge portion is specified by the non-proximity pixel data,
wherein said color conversion unit is configured to differentiate between a conversion table for use in color conversion of a picture image, and a conversion table for use in color conversion of a character image,
wherein in the case of said image data object attribute being a picture image, said color conversion unit is configured to use a conversion table wherein the black region of the picture image converted to YMCK color expression is smaller than the black region of the picture image of RGB color expression before conversion, and
wherein said reduction unit performs the same reduction process, regardless of the object attributes.

8. An image processing method for generating recording data based on image data wherein a plurality of pixels including pixels with black data and color data are arrayed, said method comprising:
a determining process of determining object attributes of said image data;
a color conversion process of converting color using a predetermined conversion table of a plurality of conversion tables for conversion from a RGB color expression to a YMCK color expression, according to the object attributes determined with said determining process;
a generating process of generating non-proximity pixel data using proximity pixel data and original data; and
a reduction process of reducing black image data of a non-edge portion of an area formed by using black ink,
wherein the non-edge portion is specified by the non-proximity pixel data,
wherein said color conversion process differentiates between a conversion table for color conversion of a picture image, and a conversion table for color conversion of a picture image,
wherein in the case of said image data object attribute being a picture image, said color conversion process uses a conversion table wherein the black region of the picture image converted to YMCK color expression is smaller than the black region of the picture image of RGB color expression before conversion, and
wherein said reduction process performs the same reduction process, regardless of the object attributes.

9. The image processing method according to claim 8, wherein said color conversion process differentiates between a conversion table for use in color conversion of a picture image, and a conversion table for use in color conversion of a line drawing.

10. The ink-jet recording device according to claim 1, wherein said reduction unit reduces black data existing in eight pixels in proximity.

11. An image processing method according to claim 8, wherein the reduction process reduces black data existing in eight pixels in proximity.

* * * * *